United States Patent [19]

Niimi et al.

[11] 4,218,318

[45] Aug. 19, 1980

[54] PROCESS AND APPARATUS FOR TREATING AND PURIFYING WASTE WATER

[75] Inventors: Tadashi Niimi, 88-104,, Sagamiono-Kodan-Jutaku, 3897, Kamitsuruma, Sagamihara-shi, Kanagawa-ken, Japan; Masanori Niimi, Tokyo; Tsutomu Arimizu, Kokubunji, both of Japan

[73] Assignees: Tadashi Niimi; Masaaki Niimi, both of Kanagawa, Japan

[21] Appl. No.: 35,833

[22] Filed: May 4, 1979

Related U.S. Application Data

[63] Continuation of Ser. No. 812,425, Jul. 1, 1977, abandoned.

[30] Foreign Application Priority Data

Jul. 16, 1976 [JP] Japan ................................ 51-83940

[51] Int. Cl.² ............................................. C02C 1/04
[52] U.S. Cl. .................................... 210/150; 210/170; 210/220
[58] Field of Search ................... 210/15, 17, 150, 151, 210/170, 198 R, 220, 221 R, 274, 283, 290, 293, 532 S

[56] References Cited

U.S. PATENT DOCUMENTS

| | | | |
|---|---|---|---|
| 1,770,830 | 7/1930 | Barbour | 210/293 |
| 1,838,263 | 12/1931 | Kelly | 210/290 |
| 3,057,796 | 10/1962 | Davis | 210/15 |
| 3,557,961 | 1/1971 | Stuart | 210/290 |
| 3,728,254 | 4/1973 | Carothers | 210/7 |
| 3,823,825 | 7/1974 | Bergles | 210/170 |
| 3,876,541 | 4/1975 | Anderson | 210/220 |
| 3,925,206 | 12/1975 | Deg | 210/220 |
| 3,968,034 | 7/1976 | Tymoszuk | 210/151 |
| 4,013,559 | 3/1977 | Johnson | 210/151 |
| 4,039,451 | 8/1977 | Smith | 210/170 |

FOREIGN PATENT DOCUMENTS

| | | |
|---|---|---|
| 871427 | 7/1949 | Fed. Rep. of Germany . |
| 1581500 | 9/1969 | France . |
| 45-4116 | 2/1970 | Japan . |
| 45-16033 | 6/1970 | Japan . |

OTHER PUBLICATIONS

Aerobics: The Waste System, Popular Science, pp. 126-128, May 1974.
Aerobics-It Can Solve Your Sewage, Popular Science, Lindsley, Oct. 1970, pp. 102, 103, 138.

Primary Examiner—Ernest G. Therkorn
Attorney, Agent, or Firm—Stevens, Davis, Miller & Mosher

[57] ABSTRACT

Waste water can be advantageously purified, removing environmental pollution such as offensive odor and pathogens, by making the best use of processes in which in a continuous way the fluid fluctuates repeatedly in fluid-gas flow in a tank, in addition to maximum utilization of activities of useful soil organisms.

1 Claim, 11 Drawing Figures

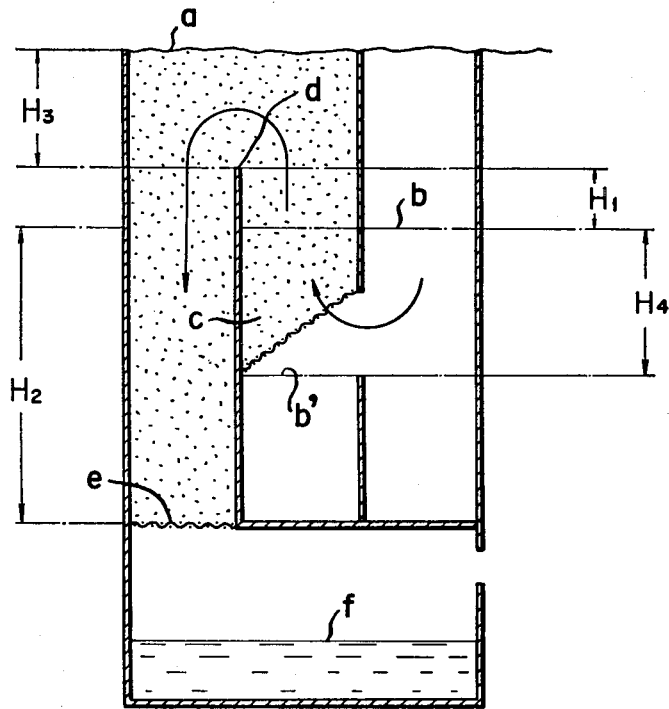
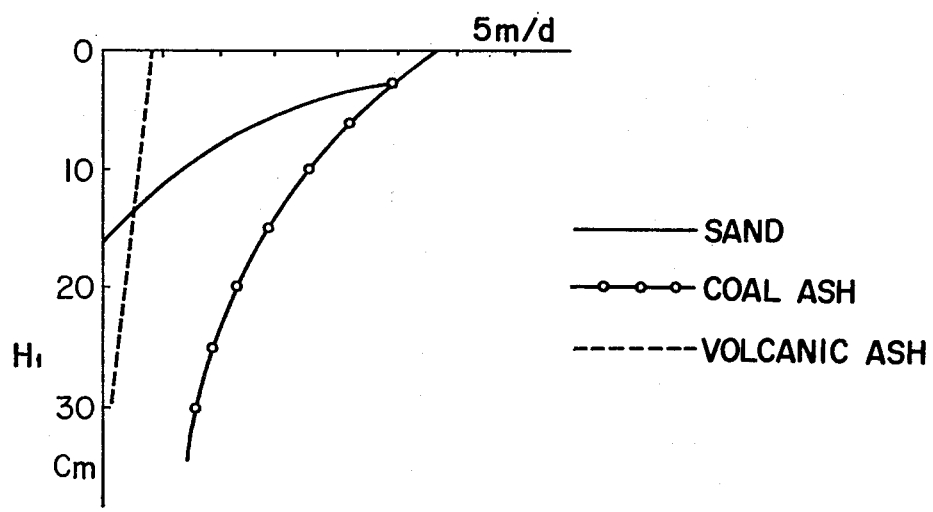

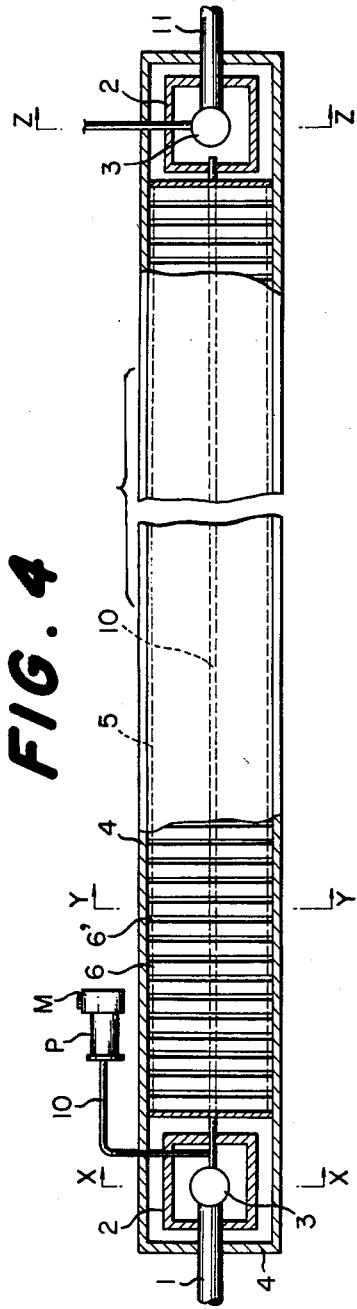
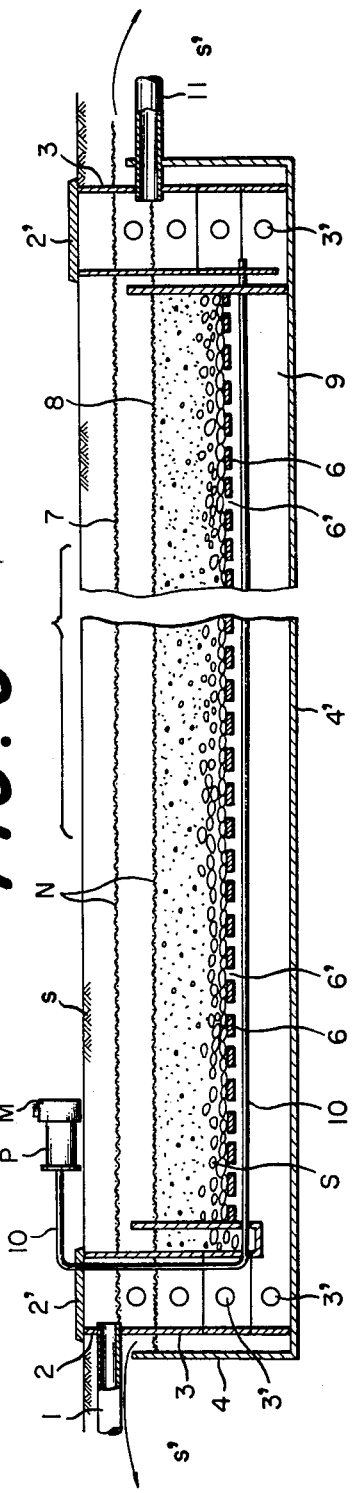

PROCESS AND APPARATUS FOR TREATING AND PURIFYING WASTE WATER

This is a continuation of application Ser. No. 812,425 filed July 1, 1977, now abandoned.

BACKGROUND OF THE INVENTION

1. Field of the Invention

This invention relates to a process and apparatus for treating and purifying waste water.

2. Brief Description of the Prior Art

Water pollution in the public water basin has been in progress in a world-wide scale by discharge of waste water to it. In every country physical, chemical and biological steps have been integrated in many ways to purify waste water, stipulating water quality standards in public water of rivers and coasts to which treated waste water has been discharged. However, removal of eutrophic salts including nitrogen and phosphorus has not been enough, failing to completely eliminate pollutants.

In order to purify these waste waters, it is believed that following three fundamental counter-measures would be available. The first is to discharge as small an amount of pollutants as possible from the processes of industrial production and our daily life. The second covers recovery of pollutants in treatment processes. The last is treatment of waste water and sludges in soils in situ, without discharging them to the public water.

A process and apparatus of this invention aim to contribute to the solution of the above-mentioned second and third counter-measures in an integrated and rational way.

SUMMARY OF THE INVENTION

This invention relates to a process for treating and purifying waste water, which comprises the following essential steps:

(a) conducting waste water to a waste water treatment tank being laid under the ground in situ, (b) moving the surface of waste water up and down in a water level fluctuation layer composed of a convex shape net lying over sand gravels accumulated on a number of perforated plates on the base of said tank, and under overlying upper aerated soils, and (c) automatically discharging a part of waste water, moving upward as capillary water, up to outside of said tank, and allowing the rest of said water (influent conducted to tank minus the amount of said capillary water) to flow down onto the on base of said tank.

Secondly, this invention relates to an apparatus for treating and purifying waste water, which comprises a waste water treatment tank being laid under the ground in situ, comprising on a base of said tank a conduit overlaid by a number of perforated plates on which are accumulated a sand gravel layer up to a net extended in a convex shape beneath surface aerated soils, and between a bottom, lowest water level, and a top, highest water level, within which the surface of the waste water fluctuates, forming water level fluctating layer.

BRIEF DESCRIPTION OF THE DRAWINGS

FIG. 1 shows a model of waste water treatment in situ by a capillary siphoning purification method.

FIG. 2 shows filtration rates in capillary siphoning in different filter bed materials.

(A): Whole view, (B), (C) and (D): magnified views.

FIG. 4 shows a ground plan of an apparatus of this invention.

FIG. 5 shows a vertical section of an apparatus of this invention.

Figure 3A:
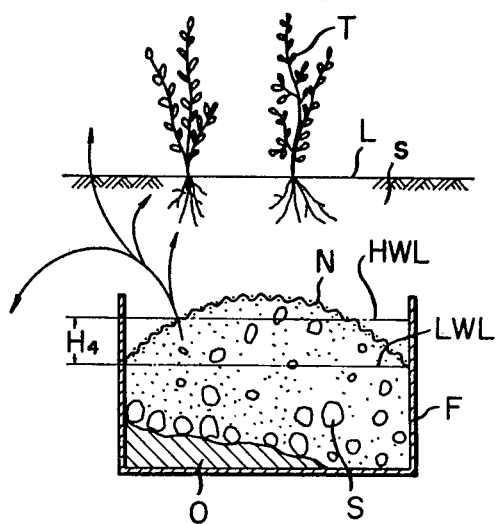
FIG. 3 shows a principle of rapid decomposition and purification of surplus waste water and sludges by a capillary siphoning purification method.
Figure 3C:
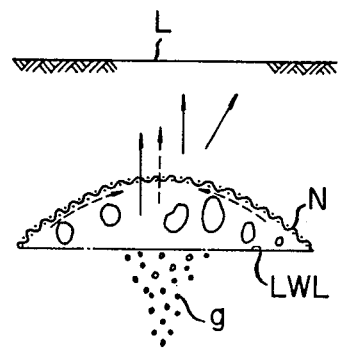
Figure 3B:
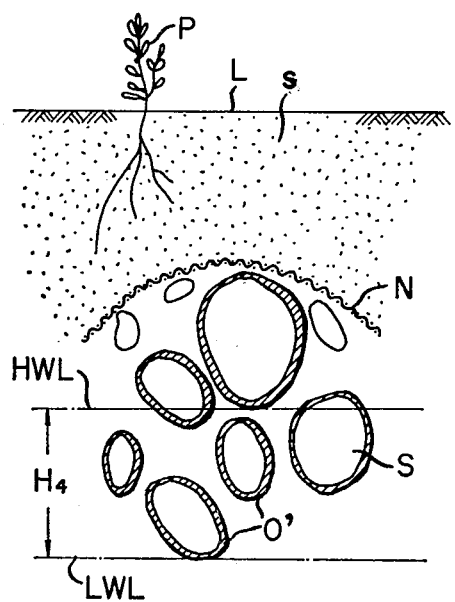
Figure 3D:
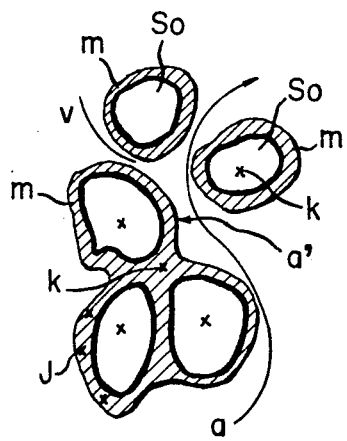
Figure 6:
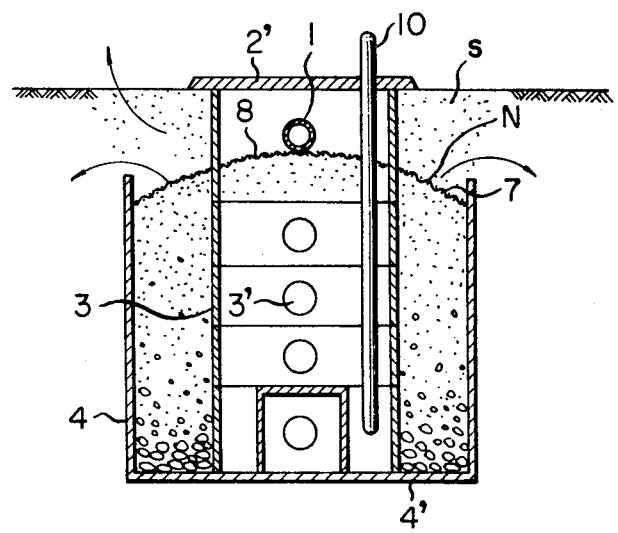

FIG. 6 shows a cross section along X—X line in FIG. 4.

Figure 7:
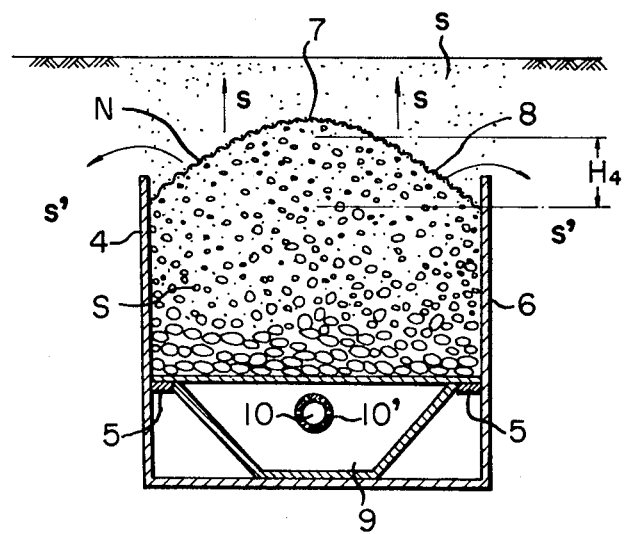

FIG. 7 shows a cross section along Y—Y line in FIG. 4.

Figure 8:
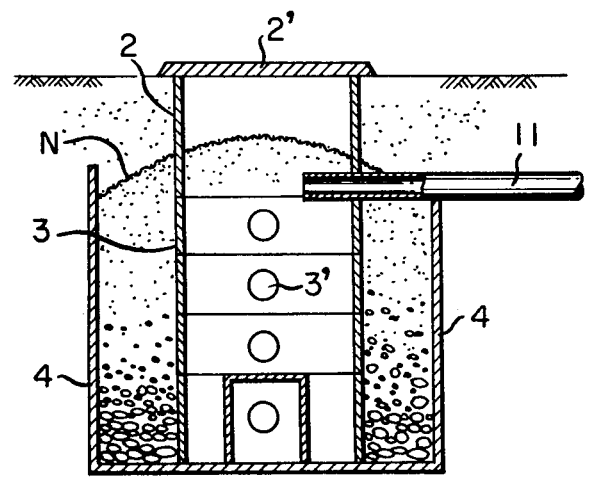

FIG. 8 shows a cross section along Z—Z line in FIG. 4.

DETAILED DESCRIPTION OF THE PREFERRED EMBODIMENTS OF THE INVENTION

In the conventional land treatment of municipal waste water gravity percolation and filtration have been mainly applied for agriculture in many countries. This invention has not only made in a scientific way the utmost use of capillary siphoning phenomena in soils with complicated soil water movement, but also has made the best use of microbial activities in soils, so that ground-water contamination may be eliminated, and in particular, decomposition of sludges is promoted in soils and offensive odor is removed.

Consequently this invention will be extremely applicable to a country like Japan where pollution control policy aims to prevent discharge of waste water to water basins such as lakes and rivers, and in the United States where no-discharge policy may be realized in the future with respect to all kinds of nevigable waters, because by this invention waste water will be purified in situ where the treatment tank is set up. Therefore, it will not be exaggeration at all to say that there would be no limit in the utilization of this invention, which is creative in the use of capillary siphoning that has not been employed even once in the field of manufacturing industry in the world, in addition to utilization of infinite number of well-known and unknown microbes in soils. In this sense social evaluation of this invention will be undoubtedly high.

Basic Difference between Conventional Land Treatment and this Invention

The conventional land treatment of municipal waste water and sludges has started from digging a shallow hole in the ground at first in to which pollutants were dumped. Then the hole was covered by soil. The pollutants disappeared almost completely in less than a year. The idea developed from this prototype aims to purify treated waste water by infiltration in soils, whether or not it may be spray-irrigation, infiltration-percolation and overland flow, and untreated waste water with offensive odor by disposing it in an underdrain frequently, overlooking simultaneous treatment of waste water and sludges in soils in any way. Therefore, intermittent incorporation of increased amounts of waste water to soils will be apt to contaminate groundwater when the ground has vertical holes to transport water, or when the soils contain gravels or volcanic ashes which render them too porous, because the retention time and the quantity of treated waste water in the upper soil layer will then not be appropriate to be purified completely by micro-organisms living therein. In other words, the purification capacity of upper soils will not be realized enough in this case.

We inventors think that regimes of soil water where activities of microbes are conspicuous are neither bounded nor absorbed, nor saturated free water, but they are either capillary water supported between soil particles or free water moving between capillary pores or microscopic pores filled with water of crumbled structures. When waste water is treated continuously by capillary structure in soils, much new technical attention must be paid to prevent contamination caused by infiltrated waste water that deducted evapotranspiration from influent.

For this purpose new techniques have been developed to salve the problems. It is a kind of infiltration-percolation method backed up by phenomena of capillary siphoning and means by which this method is applied that constitutes the central portion of this invention.

In this means beds and side-walls of underdrain are all water-proofed. However, effluent can flow out sideway across the walls at dozens of centimeters below the land surface by capillary siphoning phenomena. In other words, an upper soil layer which is dozens of centimeters deep that covers the means is utilized as artificial culture media for micro-organisms. In this way waste water which comes into the tank can be purified with a simple structure that makes the best use of the motion of capillary siphoning. Although this waste water treatment is simple, it can exceed any conventional complicated techniques of engineering in sewage treatment in the aspect of efficiency. These are the points to which this invention relates in a way fundamentally different from the conventional waste water treatment processes.

Purification of Waste Water by Capillary Siphoning:

In FIG. 1, (a) represents a soil surface and (b) the surface of waste water in a waste water treatment tank. Space between (b) and the lowest level of waste water (b') is "water level fluctuation layer", which is represented by $H_4$, where level of waste water moves up and down. (c) is the side-wall, top of which is (d). The interval between (a) and (d) represents the depth of $H_3$, real soil layer above the tank, which is equivalent to dozens of centimeters deep.

Through the soil layer represented by $H_3+H_1$, waste water infiltrates under capillary conditions with negative pressure. $H_1$ which is the difference between (b) and (d) is the minimum height that capillary water can rise. While, $H_2$ which is the difference between (b) and (e) represents gravity discrepancy. (f) represents surface of groundwater. Although distance up to (e) can be infinite, it is usually more than 20 cm. in the experiment of filtration rate in capillary siphoning, resulting from discrepancy between (b) and (e).

$H_1$ is a very important value for the design of means which is determined by a function, variables of which are quantity of influent incorporated in a time span, and the filtration rate in capillary siphoning according to the specific soil. In ordinary soils rates of filtration in capillary siphoning can be described by curves shown in FIG. 2, when $H_2$ exceeded 20 cm.

As to the design of means according to this principle decreasing $H_2$ as far as possible and increasing rate of infiltration in capillary siphoning, so that waste water may be purified and discharged from (e), two patents (Japanese Pat. Nos. 582612 and 590927) have been granted to Tadashi Niimi who invented the present invention. In this invention, however, $H_2$ is increased to infinity on the contrary and at (e) the storage tank is not set up, so that effluent may infiltrate to the groundwater level.

Rapid Surplus Sludges Decomposition

Surplus sludges will be produced in a solid setting tank solid liquid separator, aeration tank, sludge storage tank, intermediate sedimentation tank, pump and so forth, resulting in two kinds of sludges. One is settling sludges and the other sludges floating to the surface of water by gases it contains. In conventional digestion and decomposition of sludges, anaerobic decomposition has been applied to sludges. Consequently such sludges as floated to the surface of water go down usually to the bottom, after having discharged gases. However, in the course of time sludges on the surface of water become dry and change to scums, loosing water. These circumstances produce a water shortage which makes difficult the decomposition by micro-organisms, incorporating more scums on the surface of waste water which is thick and hard, thereby hampering adequate management of waste water treatment. As counter-measures, stirring of the tank, frequent transportation of sludges before scums take place and extraction of it have been made. However, there has been the slightest idea of rapid sludge decomposition on the surface of waste water.

It is a gravel layer covered by soils which the surface of waste water is elevated to contact, that could successfully solve this problem, as is illustrated in FIG. 3. In this FIGS. (A) and (B) L represents the surface of soils, F side-wall of treatment tank which can be concrete or vinyl film and so forth; N is a durable chemical net dividing soil from gravel layer. S represents a gravel with a diameter of about 10 cm, which can avoid clogging even in highly densed sludges, O sludges, O' floating sludges attached to the gravel layers and s overlaid aerated soil.

Fluctuations of waste water level between the highest water level (HWL) and the lowest water level (LWL') take place not only by influent incorporated and phenomena of capillary siphoning which transport water treated out of the tank to the direction indicated by arrow, but also by evaporation, transpiration and capillary infiltration that takes place all the time.

The reason why sludges that floated to the surface of waste water inside the gravel layer overlaid by soils do not transform to scums, is because pore space in the upper soils does not become dry under any conditions, even with humidity of 100%.

There has been no previous techniques such as ours which can prevent the occurrence of scums. However, it was a by-product of removal of offensive odor by overlying soils which will be depicted in the following that made possible this rapid sludges decomposition in practice.

In an apparatus of this invention sludges that came up to the surface of waste water with gases will not be deposited immediately after having discharged gases, but will either attach to the surface of gravels or stay in small pore spaces of the gravel layer.

In a treatment tank, on the other hand, fluctuation of the waste water level will take place automatically several times a day between HWL and LWL.

It is difficult to explain the reason why intermittent repetition of supply of water and air to the surface of gravel between HWL and LWL can contribute to the decomposition of wood-fibers of toilet paper, which is the main material produced from municipal waste water surplus sludges and which is hard to decompose, can be clarified completely; but a wooden telephone pole which is not decayed easily above the ground and in the water goes to decay at a portion about dozens of centimeters deep under the ground. This phenomena is highly made use of in this invention. Prevention of the Secondary Environmental Pollutions such as Offensive Odor and Pathogens:

As is described in the FIGS. 3 (C) and (D), waste water will go up in the overlaid soils by capillary motion along the direction indicated by the solid arrow (a). In FIG. 3 (C), (g) represents gases such as of ammonia, methane, hydrogen sulfide and so forth, that will be produced by decay and fermentation and will go up in waste water, or air that will be aerated compulsorily by aeration in it, or other gases having oxygen. The dotted arrow line indicates diffusion of bubbles of floating gases in soils. FIG. 3 (D) illustrates a model enlarged to show relationships between three-phases distribution and habitats of micro-organisms. So represents a soil particle which in the actual soils will be included in crumbled structure in general. Small gaps between soil particles are filled with water and (m) capillary water film that coats the surface of soil particles. If covered soils belonged to ordinary soil layer, water is interlinked continuously up to about two hundreds centimeters in both horizontal and vertical directions, from the surface of waste water that fluctuates between HWL and LWL. In this way amount of water to be consumed by evapotranspiration and diffusion by capillary siphoning will be supplied from the surface of the waste water. (v) represents void to be filled with air between soil particles.

Gases (g) that are produced or aerated by force in lower parts of the tank diffuse through the gaps (v) between capillary water films (m) in a very complicated way, toward the atmospheric pressure like a dotted arrow line. In a processes of removal, gases which are soluble in water or easily absorbed by soil particles, such as of oxygen, anmonia, methane, hydrogen-sulfide and so forth, will be absorbed or absorbed by capillary water films or the surface of soil particles to the extent of saturated conditions. Gases that were absorbed and absorbed will be decomposed by aerobic micro-organisms (J) or anaerobic micro-organisms (K) living on the capillary water films, being transformed to odorless materials such as nitrate, sulfur and so forth. These materials being of course soluble in water, they will fall to waste water by rainfall and others. In this way soil particles will not be long saturated with these materials and will remove odor repeatedly.

It is an well-known fact that when floating gases are air bubbled in an aeration tank, approximately one million water droplets will be produced on the surface of waste water from a liter of air. Such water droplets with a diameter of more than 30 microns will fall immediately on the surface of the waste water, but other smaller ones will fly up to several hundreds meters outside, transporting with them a large number of pathogen living in the waste water. In this means, however, water droplets ejected into outside will collide inertially in the course of flight along the solid arrow line (a') with capillary water films and will be perfectly removed in an efficient way by covered soil.

On the other hand, plants growing on soils which are represented by T or P in the FIG. 3 will absorb inorganic substances from organic waste water in soils through the roots, promoting activities of evapotranspiration. Process and Apparatus of this Invention for Treating Waste Water:

The specific embodiments of this invention are described on the basis of FIG. 4 to FIG. 8 (inclusive). From an orifice 1 municipal waste water will come into an inlet 2 in a waste water treatment tank which is laid under the ground with side-walls 4 and a base 4'. On the both sides of the base are supports 5 holding a number of ledges 6,6,6. . . Above the ledges is sand-gravel layer S covered by aerated soil layer (s). On the boundary of the two layers is a convex shape net N, through which the level of waste water will be able to fluctuate up and down between HWL and LWL, forming water level fluctuation layer.

Waste water will come into the fluctuation layer through base conduit 9 and openings 6',6',6'. . . between the ledges 6,6,6. . , or directly through side-holes 3' of inlet 3, up to the sand gravel layer S at first and then to regimes of convex shape net N. Then the surface of waste water will be elevated to the top (HWL) of the convex net with rising influent. This becomes possible by choosing such measures as, for instance, appropriate height and diameter of drain-pipe 11 connecting with base conduit 9. Below the bottom of the convex net capillary siphoning does not occur, which determines LWL. Between the bottom and top of this convex net there is formed a water level fluctuation layer. Such waste water as rising over LWL will infiltrate as capillary water into upper aerated soil as well as vast soils (s') ouside of side-wall 4 like the arrow line shown in FIGS. 6 and 7; so that with interruption of influent water level will decline. Usually influent will not be supplied continuously. For instance, no waste water will not come in at night.

However, waste water coming into the fluctuation layer will leave the fluctuation layer at all times by capillary siphoning phenomena, even during no entrance of influent, thereby resulting in evaporation, transpiration and capillary movement of treated waste water. In this way the level of waste water will descend from HWL to LWL. When influent comes in the fluctuation layer again in a greater amount than that of treated waste water flowing out of it, the water level will ascend from LWL to HWL. In this way waste water will go up and down in water level fluctuation layer with movement of influent.

If a reduction of the amount of influent in the base conduit 9, or a surplus of amount of treated waste water in the upper aerated soils (s) would occur, that waste water in the aerated soils (s) will go down by gravity with micro-organisms through the sand gravel layer S, up to the base conduit 9 through openings 6', 6', 6', . . between the ledges 6,6,6, . . . When waste water in the base conduit becomes excessive in amount, then the waste water will go up again to the net N through the sand gravel layer S and will escape off in vapor to the atmosphere like the arrow line the arrow line in FIG. 3, according to the conditions, after having left the net as capillary water to upper soil layer. These processes will be repeated over and over again, during which residual treated waste water of influent that decreased as the result of capillary movement of the treated water will be purified further and will go down on the base conduit in smaller amount. Finally, from an orifice 11 at the other end of this tank, completely treated water will go out to a near-by river, or sea or vast underground (s').

As an example of actual design of this invention, the distance from the ground surface to the top of the side-wall 4 is usually 30 cm., the width between the side-walls is about 60 cm., distance between the top of the side-wall and the bottom of the ledges 6,6,6, . . . positioned above the base conduit 9 is 70 cm., depth of the base conduit 9 is 30 cm., and the width of the base conduit is 40 cm . . . On the other hand, the distance between the top of the convex net N above the sand gravel layer S on the ledges 6,6,6, . . . . . and the bottom of it, which defines the water level fluctuation layer, will be usually 10 cm. Length of the side-walls 4 will depend upon demanded capacity of waste water treatment, so that the longer the tank, the greater treatment capacity.

Conventional waste water treatment tanks, particularly settling tanks have ranged from one to four meters deep, with a round or square shape. The reason for this is due to the easiness of removing scums in maintenance. In the case of long and shallow base conduit employed in this invention, there is no dead water in it resulting in greater efficiency in buoyancy and settlement of waste water thereby, decreasing the environmental pollution including odor and pathogen, as follows:

(a) Infiltration of treated waste water can be tremendously increased by capillary siphoning.

(b) Such buoyant materials as oils and fats, sludges containing bubbles and so forth will be detained in the pore space of the sand gravel layer S above base conduit 9. Therefore, it will be easily understood that the longer conduit will increase efficiency in separation as in the case of sedimentation.

(c) As depicted in FIG. 3, decomposition of sludges is carried out at $H_4$ between HWL and LWL, so that decomposition capacity will be greater in less deep tank with more area when the volume of it is given. As will be described in detail next, utmost use is made of the sand gravel layer S, where the largest number of earthworms and micro-organisms are able to live, to decompose sludges in this invention.

(d) Consequently, complete treatment in situ of highly condensed waste water with few treatments as well as waste water and sludges from simple toilet will be realized inside side-walls 4 and soil layers above and around the tank. Therefore the ditch and so forth required in conventional waste water treatment become unnecessary. Furthermore, the apparatus of the invention does not need much in terms of maintenance and set-up costs, so that treatment of waste water ranging form 10 l/day to 40 l/day in amount will be realized in ordinary soil by this very efficient means.

The following is another embodiment of this invention. In this embodiment perforated pipes 10 made of plastics are set in the base conduit to provide a forced draught by air-blower P through a number of small vents 10' around the pipes 10. Between boundary of the sand gravel layer S above ledges 6,6,6, . . and upper aerated soils (s) is convex net N. To $H_4$, which is between the top 7 and bottom 8 of net N, and which forms the water level fluctuation layer, a number of soil organisms such as earthworms and/or cellulose-decomposing micro-organisms are added to achieve rapid decomposition of waste water and sludges.

As an example, a perforated pipe 10 used in base conduit 9 is made of polyethylene with a diameter of 65 mm. A forced draught is made through it by power M-driven air-blower P.

This invention aims, in addition to the excellent results described above, by setting up perforated blast pipes 10 in base conduit 9 through which a forced draught can be made by power M-driven air-blower P, to make more active the decomposition of waste water and sludges by micro-organisms in base conduit 9 the life of soil organisms living in the water level fluctuation layer covered by convex net N. In this way the role of base conduit 9 becomes the same with that of conventional aeration tank, but the efficiency of this invention is much greater in the points of removing offensive odor and controlling any ratio between amount of aerobic and anaerobic micro-organisms which will contribute to increase efficiency of treatment of water and sludges.

To sum up, this invention can purify waste water and digest sludges, removing environmental pollution such as offensive odor and pathogens, by making the best use of processes in which in a continuous way the fluid fluctuates repeatedly in fluid-gas flow in a tank, in addition to maximum utilization of activities of useful soil organisms.

As to the application of this invention, it will exclude treatment of waste water containing heavy metals. Compared them with conventional land treatment by sprinkler, we can conclude that the latter employs waste water containing few offensive odor and pathogen which can be removed by this invention. Therefore, domestic effluent including refuses and waste water from food processing industry are suitable materials that this invention can treat with a considerably less capital, operation and maintenance costs.

We claim:

1. An apparatus for treating and purifying waste water, which comprises a long and shallow waste water treatment tank having an opening at the upper end thereof and being filled with sand gravel covered with a convex net covered with aerated soil, said tank being positioned dozens of centimeters below the soil surface, and being provided with:
   (1) an inlet for waste water,
   (2) a conduit in the base of said tank connected to said inlet,
   (3) perforated plates overlaying said conduit and supporting said sand gravel filling said tank,
   (4) a perforated pipe for supplying air arranged under the perforated plates, and
   (5) an outlet for treated waste water at the surface of the sand gravel covered with said convex net.

* * * * *